United States Patent [19]

Bradley, Jr. et al.

[11] Patent Number: 4,545,707
[45] Date of Patent: Oct. 8, 1985

[54] DRILLING DEVICE FOR PIPE JOINTS

[75] Inventors: Earl C. Bradley, Jr., Eastland; John vander Linden, Plano, both of Tex.

[73] Assignee: Earl C. Bradley, Eastland, Tex.

[21] Appl. No.: 454,876

[22] Filed: Dec. 30, 1982

[51] Int. Cl.$^4$ ............................................. B23B 45/06
[52] U.S. Cl. ................................ 408/111; 408/72 R; 408/86; 408/136; 408/137
[58] Field of Search ................. 408/72 R, 79, 80, 85, 408/86, 110, 111, 113, 114, 136, 137, 199, 241 G, 200, 202, 203; 51/241 S

[56] References Cited

U.S. PATENT DOCUMENTS

| 1,033,419 | 7/1912 | King | 408/111 |
|---|---|---|---|
| 1,384,116 | 7/1921 | Blair | 408/111 |
| 2,309,765 | 2/1943 | Haase | 408/72 R |
| 2,501,000 | 3/1950 | Murphey | 408/72 R |
| 3,726,549 | 4/1973 | Bradley, Jr. | 285/356 |

Primary Examiner—Gil Weidenfeld
Assistant Examiner—Daniel W. Howell
Attorney, Agent, or Firm—H. Mathews Garland

[57] ABSTRACT

A set screw pocket drilling device for drilling blind holes in a pipe surface at a pipe joint for set screws holding the joint together including an externally threaded sleeve sized to fit the set screw hole and engage the surface of a pipe within a retainer in which the set screw hole is drilled, a drill fitting through and rotatable relative to the sleeve, and apparatus for rotating the drill relative to the sleeve. One embodiment of the device includes only a sleeve and a drill fitting through the sleeve having an outward end extending from the outward end of the sleeve for engagement of a wrench to rotate the drill and the sleeve. Another form of the device has a sleeve provided with a head having locking lugs, a drill extendable through the sleeve and having a head provided with a locking flange, and a clamping bracket for securing the sleeve head with the drill head at a position at which the cutting end of the drill is extended beyond the sleeve end so that a set screw pocket is drilled as the sleeve is screwed into a set screw hole of a pipe joint retainer. A third form of the device includes an externally threaded sleeve having a rotatable head and a drill provided with a cam coacting with the head to advance the drill as the head and cam are turned by means of a cam handle.

3 Claims, 15 Drawing Figures

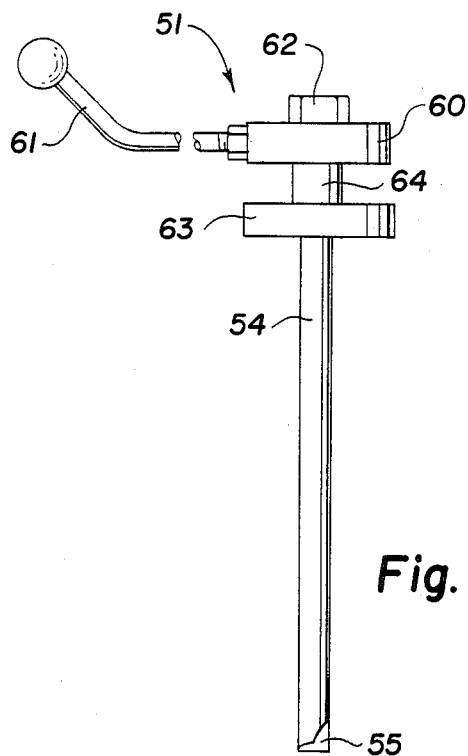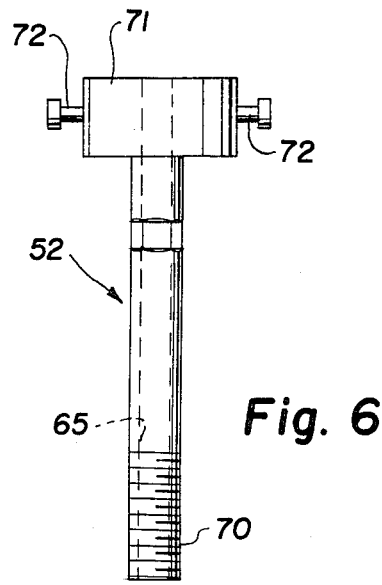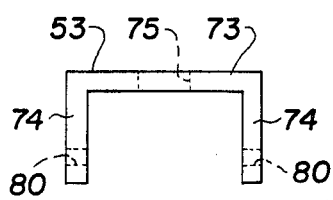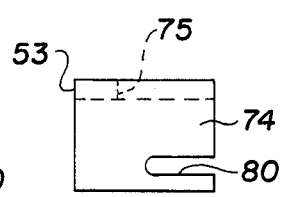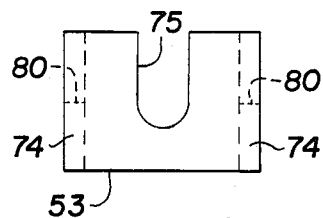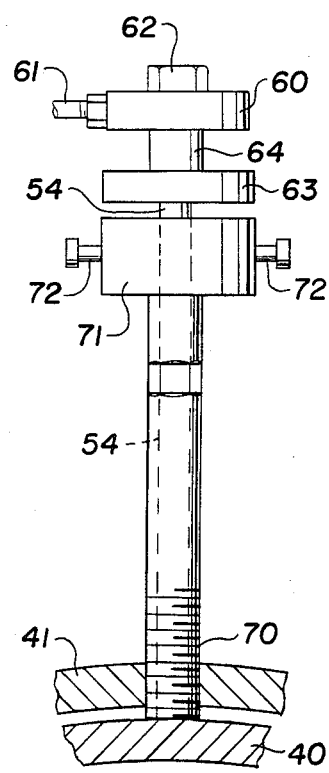

DRILLING DEVICE FOR PIPE JOINTS

This invention relates to drilling devices used in making pipe joints and more particularly relates to a drilling device for forming set screw pockets for engagement of set screws between pipe joint restraining devices and cast, steel and ductile iron pipe.

For in excess of forty years set screws have been used to secure various forms of restraining rings on cast, steel, and ductile iron pipe in making up pipe joints. Such set screws are spaced circumferentially around a restraining ring operating along radial axes so that the inward ends or tips of the set screws engage the outer surface of the pipe within the restraining ring. A typical pipe joint using such a restraining ring fitted with set screws is illustrated and described in U.S. Pat. No. 3,726,549 issued to Earl C. Bradley, Jr. Apr. 10, 1973 entitled PIPE JOINT RETAINER GLAND. In tightening the set screws of such a retainer gland to effectively penetrate the pipe surface for embedding the inward ends of the set screws to effectively secure the restraining ring on the pipe, it has been customary to use forces as high as seventy to one hundred twenty foot pounds of torque. Variations in the hardness and the character of the various pipes using such rings to form joints have presented numerous assembly problems. Often the pipe is too hard for the set screws to properly cut the necessary pockets for penetration of the inward ends of the set screws in the pipe. Also, the pipe is often too soft and thin to sustain the ordinary forces applied to the set screws resulting in the pipe bending and frequently causing leaks. Thin soft pipe particularly when made of ductile iron and lined with cement as used in water mains is especially difficult to prepare for an effective joint because the pipe flexes and destroys the cement lining. Thus the lack of uniform hardness and other structural characteristics of pipe results in frequent over torquing or under torquing when installing set screws in a pipe joint.

It is a principal object of the present invention to provide a new and improved tool for forming set screw pockets around a pipe during installation of a set screw held restraining ring for holding a pipe joint together.

It is another object of the invention to provide a set screw pocket tool which drills uniform set screw pockets in a pipe surface regardless of the hardness and character of the pipe.

It is another object of the invention to provide a set screw pocket drilling device that requires substantially less torque to operate than normally applied to set screws where the set screws are used to form the required pockets.

It is another object of the invention to provide a set screw pocket drilling device which is used during the actual installation of a pipe joint to form the required set screw pockets in a pipe surface.

It is another object of the invention to provide a set screw pocket drilling device which uniformly cuts a set screw pocket of predetermined depth regardless of the pipe character or hardness.

It is another object of the invention to provide a set screw pocket drilling device which fits standard set screw holes in pipe joint restraining rings and the like.

In accordance with the invention there is provided a set screw pocket drilling device particularly useful in the installation of pipe joints using set screw secured restraining rings which includes an externally threaded sleeve engageable in a set screw hole and a drill disposed through the sleeve having a cutting end extendable a predetermined distance beyond the sleeve end for making a cut into a pipe forming a set screw pocket in the pipe. The drill is rotatable in the sleeve while the sleeve is turned to feed the drill toward the pipe surface. The several different embodiments illustrated show various structural relationships between the drill and sleeve and the features of the invention for controlling the depth of cut.

The foregoing objects and the advantages of the invention as well as specific details of preferred embodiments thereof will be better understood from the following detailed description taken in conjunction with the accompanying drawings wherein:

FIG. 5 is a side view in elevation of a drill or cutter spindle of a second embodiment of the invention;

FIG. 6 is a side view in elevation of the thrust sleeve employed with the cutter spindle of FIG. 5 in the second invention embodiment;

FIG. 7 is a side view in elevation of a thrust clamp used for holding the cutter spindle and thrust sleeve of FIGS. 5 and 6 together during drilling;

FIG. 8 is a right end view of the thrust clamp of FIG. 7;

FIG. 9 is a top plan view of the thrust clamp of FIGS. 7 and 8;

FIG. 10 is a fragmentary view in section and elevation illustrating the cutter spindle, thrust sleeve, and thrust clamp of the second embodiment of the invention assembled in a pipe joint restraining device during the first step of drilling a set screw pocket;

Figure 1:
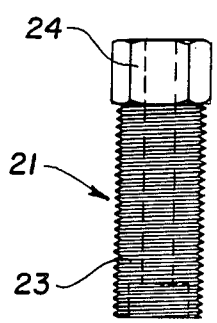
FIG. 1 is a side view in elevation of the threaded sleeve of a first embodiment of the invention.
Figure 2:
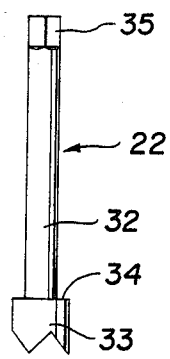
FIG. 2 is a side view in elevation of the drill used with the sleeve of FIG. 1 in the first embodiment of the invention.
Figure 3:
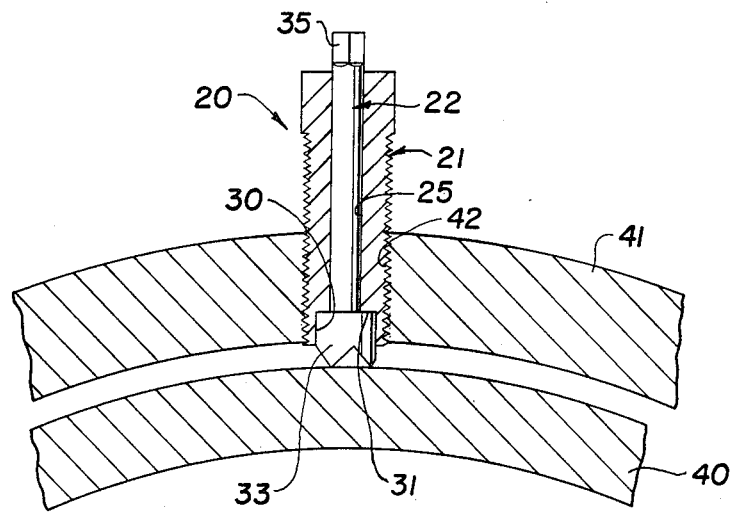
FIG. 3 is a fragmentary view in section and elevation showing the first embodiment of the invention installed through a pipe joint restrainer device preparatory to drilling a set screw pocket in a pipe surface.
Figure 4:
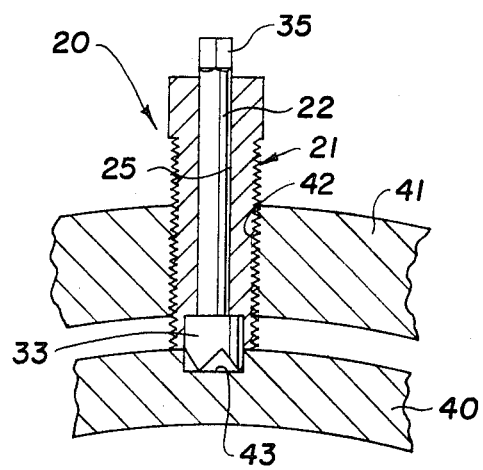
FIG. 4 is a fragmentary view in section and elevation similar to FIG. 3 showing the completion of the drilling of a set screw pocket with the first embodiment of the invention.

Referring to FIGS. 1-4, a first cutting device 20 embodying the features of the invention includes a thrust sleeve 21 and a drill or cutter spindle 22. The cutter spindle fits in the thrust sleeve in the relationship illustrated in FIG. 4. The thrust spindle has an externally threaded body portion 23 provided with exactly the same threads as the set screw, not shown, for which the drilling device is forming the set screw pocket in a pipe surface. The thrust sleeve has a head 24 configured with flat surfaces for applying a standard wrench to the thrust sleeve to rotate the sleeve. Internally as shown in FIG. 4 the thrust sleeve has a uniform diameter bore 25 opening at a lower end into a larger uniform bore 30 forming a thrust pocket in the sleeve which receives the drilling head of the cutter spindle and determines the depth of cut. Between the bore 25 and the enlarged bore or pocket 30 the thrust sleeve has an internal downwardly facing thrust shoulder 31. The cutter spindle 22 has a shank 32 sized to fit in a rotatable relationship in the sleeve bore 25 and an enlarged drilling head 33 which is sized to fit rotatably within the pocket 30 of the sleeve. The drilling head has an external annular top surface 34 which forms a thrust shoulder on the head engageable with the thrust shoulder 31 in the sleeve. The length of the head 33 is greater than the depth of the pocket 30 by a distance equal to the depth that a set screw pocket is to be drilled into a pipe surface. In other words, the distance between the cutter spindle lower end tip and the thrust shoulder 34 on the spindle exceeds the distance between the sleeve thrust shoulder 31 and the lower end edge of the sleeve by an amount equal to the depth of the set screw pocket desired to be drilled by the device 21. The lower cutting end edges of the drilling head 33 are configured to cut the desired shape of hole or set screw pocket depending upon the shapes of the ends of the set screws for which the pocket is prepared. Some screws have what is referred to as a "cup point" which has a somewhat curved shape and thus for such a screw the cutting head 33 would be shaped to drill a cup-shaped pocket. Other set screws have basically a square hole shape meaning that the end face of the screw is perpendicular to the sides. Such a shape requires a "dog point" on the drill head. The upper end 35 of the cutter spindle has a series of flat surfaces sized and shaped to receive a standard wrench for rotating the cutter spindle in the thrust sleeve. The length of the cutter spindle exceeds the length of the thrust sleeve sufficiently for the cutter spindle end 35 to project above the upper end of the thrust sleeve when the cutter spindle is installed in the thrust sleeve as illustrated in FIGS. 3 and 4.

Reference is made to FIGS. 3 and 4 to illustrate the operation of the set screw pocket drilling device 20 when installing a restraining device on a pipe joint. Such a restraining device may be the Pipe Joint Retainer Gland of U.S. Pat. No. 3,726,549, supra. The drilling device 20 is used to form set screw pockets in the outer surface of the pipe 40 around which the retainer gland or ring 41 is being installed. The gland or ring 41 is provided with a series of circumferentially spaced set screw holes 42 in which set screws, not shown, are installed in the final installation for holding the ring 41 on the pipe 40. The purpose of using the drilling device 20 is to produce a set screw pocket 43 in the outer surface of the pipe 40 so that the inward end of a set screw may engage the pocket for securing the ring 41 on the pipe 40. The pocket is drilled into the pipe surface rather than being forced into the pipe surface by the set screw tip which as previously discussed often damages the pipe. For operating the drilling device 20 of the invention the set screw, not shown, is removed from the set screw hole 42 in the ring 41. The drill or cutter spindle 22 is installed in the thrust sleeve 21 by inserting the shank 32 of the spindle into the bore 25 of the sleeve through the lower pocket end of the sleeve until the shoulder 34 on the spindle cutting head engages the shoulder 31 within the sleeve in the relationship illustrated in FIGS. 3 and 4. The assembly of the cutter spindle and the thrust sleeve is then installed in the hole 42 of the ring 41 by threading the thrust sleeve into the hole until the end tip of the cutting head 33 on the spindle engages the outer surface of the pipe 40 as illustrated in FIG. 3. The assembly may be turned to this point with very little force and possibly by hand depending upon the tightness of the threaded connection between the thrust sleeve and the set screw hole threads. With the tip end of the drill head 33 engaging the surface of the pipe 40, the cutter spindle 22 is rotated with a wrench or a ratchet engaging the end portion 35 while simultaneously the thrust sleeve 21 is turned to feed the cutter spindle inwardly. Both the cutter spindle and the sleeve are turned until the drill head 33 has drilled into the pipe 40 sufficiently for the inward end edge of the sleeve to seat against the pipe surface as represented in FIG. 4. The cutter spindle head drills the hole or set screw pocket 43 in the pipe 40. The depth of the pocket 43 is determined by the extent to which the cutter head 33 extends beyond the end edge of the sleeve 21. Because the cutter spindle or drill 22 is fed inwardly by rotating the sleeve 23, when the sleeve 23 seats against the outer surface of the pipe 40, the drill head 33 of the cutter spindle is no longer cutting into the pipe. The cutter spindle and sleeve are then removed by rotating or unscrewing the sleeve from the set screw hole 42. The set screw, not shown, is then replaced in the set screw hole. The set screw is turned until the inward end of the set screw is in the socket 43. It is not necessary to torque the set screw; it is only necessary to "snug it up". Each of the set screws in the gland 41 is sequentially replaced with the socket drill device 20 until a set screw socket has been drilled in the pipe 40 for each of the set screws in the ring 41 replacing each set screw as the socket for the screw 43 is drilled. Thus, all of the set screws are tightened against the pipe with the inward ends of the set screws each entering the socket 43 drilled for the screw.

A second embodiment of the invention is illustrated in FIGS. 5–12 which show a set screw pocket drilling device or tool 50. The drilling tool 50 includes a cutter spindle or drill 51, FIG. 5, a thrust sleeve 52, FIG. 6, and a thrust clamp 53, FIGS. 7–9. The cutter spindle has a shank 54 provided on a lower end with a drill or a cutting head 55, a head 60 on the opposite end having an integral handle 61 and a wrench lug 62, and an annular thrust collar 63 formed along the shank spaced from the head 60. An enlarged shank portion 64 connects the thrust collar 63 and the head 60. The thrust sleeve, FIG. 6, is provided with a bore 65 sized to receive the cutter spindle so that the cutter spindle is free to rotate in the thrust sleeve. The lower end portion of the thrust sleeve shank is externally threaded at 70 with threads which match the set screw threads of the restraining ring 41. The thrust sleeve has an annular head 71 formed on the upper end of the shank provided with laterally oppositely extending thrust lugs 72. The thrust clamp, FIGS. 7–9, has a top body or plate portion 73 and downwardly extending legs 74 which are disposed perpendicular to the plate 73 in parallel spaced relation at opposite ends of the plate. The plate 73 has a sidewardly opening slot 75, FIG. 9. Similarly the legs 74 each has a sidewardly opening slot 80 opening in the same direction as the slot 75. The slot 75 is slightly wider than the cutter spindle shank 64 so that the plate 73 fits around the shank portion 74 when the thrust clamp is in operation. The slots 80 in the legs 74 are slightly wider than the thrust lugs 72 so that the legs 74 fit around the thrust lugs when the thrust clamp is in operating position.

Figure 11:
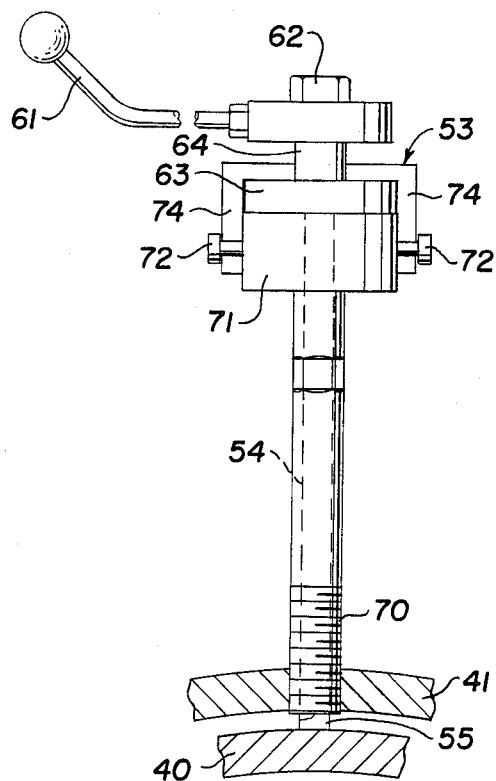
FIG. 11 is a fragmentary view in section and elevation similar to FIG. 10 showing a succeeding step in operating the second embodiment of the invention.
Figure 12:
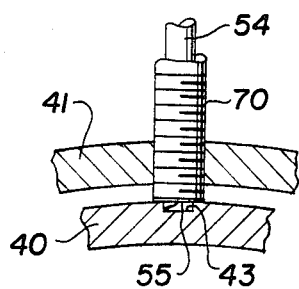
FIG. 12 is a fragmentary view in section and elevation showing the completion of the drilling of a set screw pocket with the drilling device of FIG. 11.

The operating relationships of the cutter spindle 51, the thrust sleeve 52, and the thrust clamp 53 of the tool 50 are illustrated in FIG. 11. The shank 54 of the cutter spindle fits downwardly through the bore 65 of the thrust sleeve with the bottom face of the thrust collar 63 resting on the top face of the thrust sleeve head 71 while the drill head 55 on the cutter spindle extends below the lower end of the threaded portion 70 of the thrust sleeve a distance equal to the depth of cut desired for the set screw pocket 43 to be formed by the tool 50. The thrust clamp 53 slides over the cutter spindle shank portion 64, the thrust collar 63, and the thrust sleeve head 71 with the cutter spindle shank portion 64 fitting in the slot 75 of the plate 73 and the two thrust lugs 72 on the thrust sleeve head 71 fitting in the slots 80 of the legs 74 of the thrust clamp. The thrust clamp is installed after the cutter spindle is fully inserted through the thrust sleeve in the relationship of FIG. 11 by inserting the thrust clamp into operating position from one side of the assembled cutter spindle and thrust sleeve. The thrust clamp secures the cutter spindle with the thrust sleeve so that rotation of the thrust sleeve feeds the cutter spindle or drill downwardly while the drill is rotated to cut the set screw pocket in the pipe. The thrust clamp allows the cutter spindle to rotate while locking the spindle with the sleeve so that the spindle may not move longitudinally relative to the sleeve.

The first step in the preferred procedure of drilling a set screw pocket 43 with the drilling tool 50 is the installation of the thrust sleeve in the set screw hole 42 of the restraining ring 41 as previously described in relation to FIG. 4. The threaded portion 70 of the thrust sleeve 52 is threaded into the set screw hole 42 until the lower end edge of the thrust sleeve shank engages the surface of the pipe 40 as illustrated in FIG. 10. The cutter spindle 51 is then inserted into the thrust sleeve until the end edge of the cutting tip 55 of the cutter spindle engages the pipe surface. In this relationship the lower end of the thrust sleeve and the lower end of the cutter spindle cutting head are essentially in alignment so that the thrust collar 63 on the cutter spindle is spaced above the thrust sleeve head 71 as shown in FIG. 10. The thrust sleeve is then unscrewed until the top face of the thrust sleeve head 71 engages the bottom face of the thrust collar 63 on the cutter spindle. This step retracts the lower end of the thrust sleeve along the cutter spindle shank so that the cutting head 55 on the cutter spindle shank projects below the thrust sleeve the distance of the cut to be made to form the set screw socket 43. The thrust clamp is then installed on the thrust sleeve and cutter spindle by holding the clamp with the body portion 73 horizontal, the legs 74 extending downwardly, and moving the clamp toward the assembled thrust sleeve and cutter spindle in a sidewardly direction until the clamp is positioned to lock the cutter spindle thrust collar 63 with the thrust sleeve head 71. As previously stated, the thrust clamp slot 75 fits around the cutter spindle shank portion 64 and the slots 80 on the thrust clamp legs fit around the thrust lugs 72 on the thrust sleeve head so that the cutter spindle and thrust sleeve are clamped together as shown in FIG. 11. The thrust sleeve is then turned to feed the sleeve downwardly in the set screw hole 42 while simultaneously the cutter spindle is rotated either with the handle 61 or with a wrench fitted on the wrench lug 62 so that the cutting head 55 cuts the set screw socket 43 in the pipe 40. When the lower end edge of the thrust sleeve engages the pipe surface, the cutter spindle tip has cut into the pipe 40 to a depth equal to the length of the cutter spindle tip extending beyond the end of the thrust sleeve. Because the end edge of the thrust sleeve seats on the pipe surface around the set screw socket 43 the thrust sleeve can be advanced no farther downwardly and thus the socket can be drilled no farther. The tool 51 is them removed from the set screw hole 42 by unscrewing the thrust sleeve from the hole. The set screw previously removed from the hole 42 is screwed back into place so that the lower end or tip of the set screw enters the socket 43. All of the set screws around the restraining ring 41 are sequentially removed, a set screw socket 43 is drilled with the tool 51 for the set screw, and the set screw is restored to the hole 42 from which it was removed. The set screws may be lightly tightened without the use of a torque wrench and will effectively hold the restraining ring 41 on the pipe 40 under operating conditions for the joint held by the restraining ring.

Figure 13:
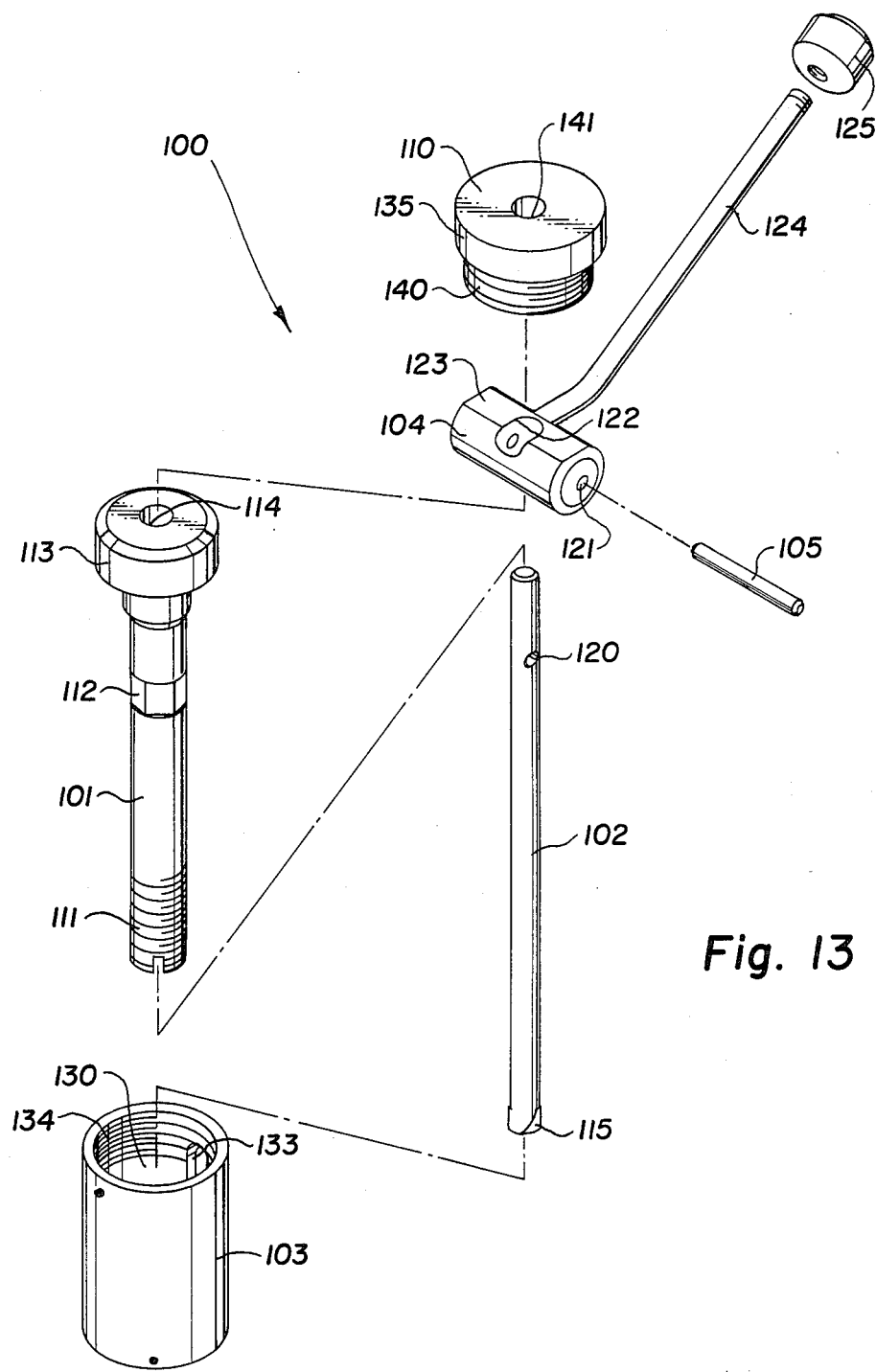
FIG. 13 is an exploded perspective view of a third embodiment of a device for drilling set screw pockets in accordance with the invention.
Figure 14:
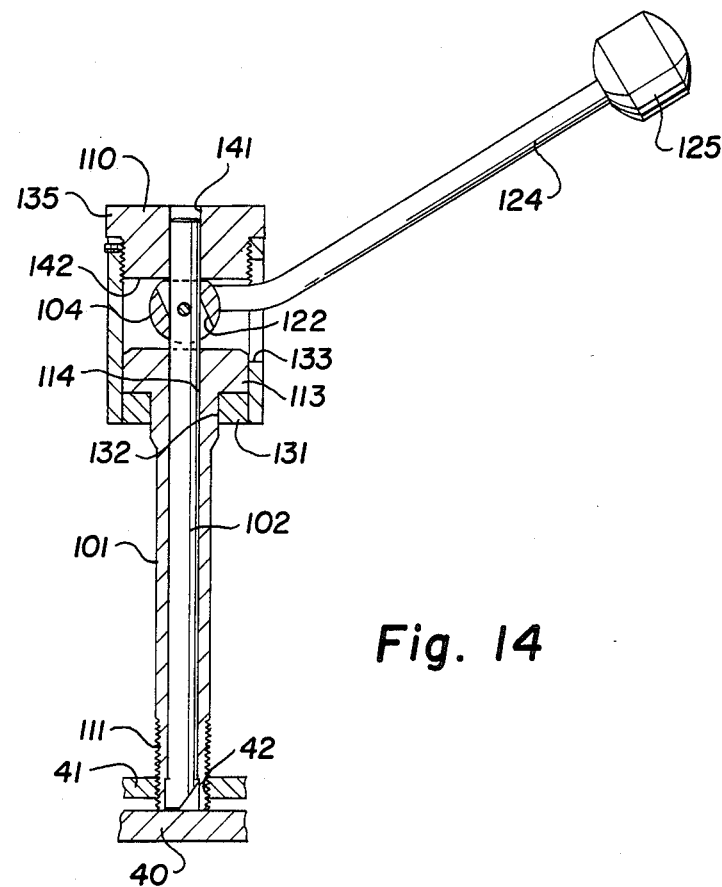
FIG. 14 is a view in section and elevation of the assembly of FIG. 13 installed at a pipe joint preparatory to drilling a set screw pocket.
Figure 15:
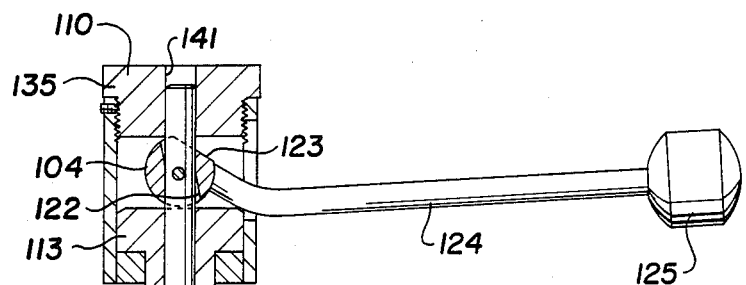
FIG. 15 is a view in section and elevation of the device of FIG. 14 at the completion of the drilling of a set screw pocket.

A third embodiment of a set screw pocket drilling tool 90 is illustrated in FIGS. 13-15. Referring to FIG. 13, the drilling device 100 includes a thrust sleeve 101, a drill 102, a tubular housing 103, a cam 104, a lock pin 105, and a cap 110. The sleeve 101 is provided with threads 111 along a lower end portion for engaging the threaded set screw hole in a retainer gland. Intermediate the opposite ends of the sleeve 101, the sleeve is provided with circumferential flats 112 for a wrench to screw the sleeve into the set screw hole. The upper end portion of the sleeve 101 is enlarged providing an external annular flange 113 sized to fit within the tubular body 103. The sleeve 101 has a bore 114 which is sized to receive the drill 102 permitting rotation of the drill. The drill 102 has a cutting tip 115 designed to cut the desired set screw pocket into the surface of a pipe. The upper end portion of the drill 102 has a transverse lock pin hole 120 sized to receive the lock pin 105 for locking with the cam 104. The cam 104 is a cylindrical member having an axial bore 121 sized for the lock pin 105. The cam 104 also has a transverse hole 122 extending generally perpendicular to the axis of the cam along the hole 121 and is deviated sufficiently to permit rotation of the cam on the drill to the extent necessary to drive the drill 102 downwardly the desired depth. As evident in FIGS. 14 and 15, the hole 122 is sized to loosely receive the drill 102 and is deviated by the opposite ends of the hole being outwardly flared sufficiently to permit rotation of the cam about the axis of the bore 121. The cam 104 has a flat cam surface 123 which urges the cam and drill downwardly as explained in detailed hereinafter. The cam surface lies in a plane perpendicular to a radius line to the cam axis, or stated otherwise, lies in a plane including chords of circles drawn in the cylinder surface of the cam. The cam has an operating handle 124 provided with a removable knob 125 on the outer end portion of the handle. The tubular housing 103 has a bore 130 slightly larger than the head end flange 113 of the sleeve 101 so that the housing may rotate relative to the sleeve. As seen in FIGS. 14 and 15 the housing 103 has an internal annular flange 131 provided with a bore 132 which receives the shank portion of the sleeve 101 allowing the housing to rotate relative to the sleeve while the internal annular flange 131 engages the flange 113 on the sleeve limiting the outward movement of the housing on the sleeve. The housing 103 has an elongated oval side opening 133 for the cam handle 124. The upper end portion of the housing 103 is internally threaded at 134 for engagement of cap 110 with the housing. The cap 110 has an external annular flange portion 135 and externally threaded lower end portion 140 which engages the threads 134 in the housing 103. When the cap is fully screwed into the housing, the flange 135 on the cap rests against the upper end edge of the housing as seen in FIGS. 14 and 15. The cap has an axial bore 141 for the upper end portion of the drill 103 above the cam 104.

Referring to FIGS. 14 and 15, the parts of the drilling device 100 are assembled in the relationship illustrated. The thrust sleeve 101 is inserted, shank end first, downwardly through the tubular housing 103 until the flange 113 on the sleeve head rests on the flange 131 within the housing. The drill 102 is inserted upwardly through the bore 114 of the thrust sleeve 101. The cam 104 is manipulated into the bore of the housing 103 over the upper end portion of the drill which passes through the deviated hole 122. This may be done by first inserting the handle 124 of the cam with the knob 125 removed downwardly into the bore 130 of the housing 103 and outwardly through the side opening 133 in the housing until the cam is located above the housing bore with the cam hole 122 aligned with the upper end of the drill 104. The cam is then maneuvered downwardly over the drill end until the hole 121 through the cam is aligned with the hole 120 in the upper end portion of the drill. The lock pin 105 is then inserted through the aligned holes 120 and 121 locking the cam on the drill as shown in FIGS. 14 and 15. The cap 110 is then screwed downwardly into the housing 103 with the upper end portion of the drill fitting into the bore 141 of the cam as shown.

After the parts of the device 100 are assembled as in FIGS. 14 and 15, the relationship of the parts permits the thrust sleeve 101 to remain stationary while the housing 103, the cap 110, the drill 102, and the cam 104 with the cam handle 124 are rotatable about the axis of the sleeve. The relative lengths of the sleeve 101 and the drill 102, as well as the positioning of the cam 104 on the drill, locates the lower tip end of the drill in alignment with the lower end edge of the sleeve 101 when the cam surface 123 engages surface 142 of the housing cap 110 as represented in FIG. 14. Co-action between the cam surface 123 and the surface 142 on the housing cap as the cam 104 is rotated on the pin 105 drives the cam and drill downwardly relative in the fixed sleeve 101 for drilling a set screw pocket with the tip 115 of the drill 102.

The drilling device 100 is operated in the assembled relationship of FIG. 14 by screwing the thrust sleeve 101 downwardly in a set screw hole 42 in the pipe joint gland 41. If necessary a wrench may be applied to the flat surfaces 112 on the sleeve 101 to rotate the sleeve as the threads 111 on the sleeve are threaded through the hole 42 until the lower end edge of the sleeve 101 engages the outer surface of the pipe 40 as shown in FIG. 14. The lower end edge of the drilling tip 115 of the drill 102 is aligned with the lower end edge of the sleeve 101 while the cam surface 123 on the cam 104 engages the flat thrust surface 142 of the housing cap 110. The drilling is then commenced using the handle 124 turning the drill with the cam 104, the housing 103 and the housing cap 110 which rotate as a unit about the axis of the drill 102 and sleeve 101. Simultaneously, the handle 124 is depressed which rotates the cam 104 clockwise about the axis of the pin 105 as viewed in FIG. 14, so that the cam surface 123 is turned clockwise relative to the bottom thrust surface 142 of the housing cap. The turning of the cam surface 123 forces the drill downwardly relative to the fixed sleeve 101 so that the drill tip 115 of the drill is extended below the lower end edge of the sleeve 101 drilling into the surface of the pipe 40. The handle 124 is turned about the axis of the drill and simultaneously depressed until the position of FIG. 15 is reached at which the drilling tip 115 is fully extended below the lower end edge of the sleeve 101 drilling the pocket 43 for a set screw into the surface of the pipe 40. It will be apparent that the depth of cut of the drill is dependent upon the dimensions of the parts of the device including particularly how much of the cam 104 is removed to provide the cam surface 123. The maximum drill depth will be determined by the distance along a radius line from the normal cylindrical surface of the cam to the cam surface 123. It will be obvious that when the cam has been rotated to the extent that the cam surface 123 has been fully revolved downwardly away from the bottom surface 142 of the cap 110 and the cylindrical portion of the cam surface is engaging the bottom surface 142, the maximum cam action has been achieved. Thus, the distance on a radius line of the cam measured from the normal cylindrical surface of the cam to the cam surface 123 toward the center of rotation of the cam determines the maximum depth of cut obtainable. It will also be obvious that with any given device design, the depth of a cut may be varied by unscrewing the cap surface 123. The spacing between the surface 142 and the cam surface 123 when the parts of the device are positioned as in FIG. 14 determines the reduction in the depth of cut which may be made with the drill. The maximum cut is obtained when the surfaces initially contact as in FIG. 14. As the cap 110 is unscrewed therby providing progressively less cam action by the surface 123, the depth of cut is progressively reduced. If the cap were unscrewed to the position at which the surface 142 is spaced from the axis of the pin 105 the same distance as the cylindrical surface portion of the cam 104 is from the axis of the pin 105, no cut at all will be obtained by the drill 102 as the cam is rotated.

The device 100 is extremely easy to use to accurately produce a set screw pocket of a desired depth. The sleeve 101 is simply screwed into the set screw hole 42 until the lower end edge of the sleeve seats on the surface of the pipe 40. With the sleeve 101 remaining stationary, the handle 124 is simply turned and depressed until the maximum camming action is obtained at the fully depressed position of the handle thereby producing the maximum depth of pocket which can be drilled with the device. The device is then removed by unscrewing the sleeve 101 and a set screw is replaced in the hole 42 with the lower end or tip of the set screw engaging the set screw pocket 43 as previously discussed. The work that a set screw does in a joint restraining device, is to keep the pipe joint from slipping apart due to internal hydrostatic pressure. The device described in this application enhances the screw's opportunity to perform the work in a much stronger and surer mannner. Pipe and lining damage is eliminated since little or no torque on the screw is required to cut the pocket as in the past. The screw snugged up in the pocket is what does the holding—not the torque on the screw.

What is claimed is:

1. A set screw socket drilling tool for forming a blind hole in a surface of a first member to receive a tip of a set screw extending from an adjacent second member, said tool comprising: a tubular thrust sleeve having an externally threaded first end engageable in a set screw hole of said second member, said sleeve having an external annular flange around a second opposite end thereof; a tubular housing rotatable on said second end of said thrust sleeve, said housing having an internal annular retainer flange at a first end thereof engageable with said flange on said thrust sleeve, said housing having an open second opposite end and a longitudinal opening a side thereof located between said second end of said housing and said flange on said thrust sleeve when said thrust sleeve is in said housing; a cutter spindle having a drilling tip on a first end thereof rotatably positioned in the bore of said thrust sleeve, said drilling end of said spindle being extendable from said first end of said thrust sleeve for drilling said set screw socket in said first member when said first end of said thrust sleeve engages said first member, said spindle having a second end portion thereof extending outwardly from said second end of said thrust sleeve, said second end portion of said spindle having a transverse lock pin hole; a cam mounted on said second end portion of said spindle on an axis of rotation coincident with the axis of said transverse lock pin hole through said spindle, said cam having a deviated hole there through extending transverse to said axis of rotation of said cam, said second end portion of said spindle being disposed through said deviated hole, said cam having a cam surface lying in a plane perpendicular to a line extending through said axis of rotation and parallel to said axis of rotation, said cam surface being movable from a first position perpendicular to the logitudinal axis of said spindle to a second position disposed at an angle with said axis of said spindle; an end cap on said housing, said end cap having an inside thrust surface lying in a plane perpendicular to said longitudinal axis of said spindle for engagement by said cam surface whereby rotation of said cam from said first position to second position advances said spindle in said thrust sleeve toward said first member for drilling said set screw socket in said first member; and a handle secured at a first end with said cam and extending through said longitudinal opening in said housing for turning said spindle and rotating said cam to advance said spindle in a drilling direction as said spindle is turned.

2. A device in accordance with claim 1 wherein said cam comprises a cylindrical member and said axis of rotation of said cam is coincident with axis of said cylindrical member and said cam surface on said cam lies in a plane coincident with a chord of a circle in the surface of said cam aligned in a plane perpendicular to the longitudinal axis of said cam.

3. The device of claim 2 wherein said housing cap is adjustable for changing the distance between said cam surface on said cam and said thrust surface on said cap.

* * * * *